A. A. ROSENGREN.
HERMETICAL SEALING DEVICE FOR BOXES, TINS, OR CANS FOR PRESERVES OR FOR OTHER VESSELS.
APPLICATION FILED JUNE 27, 1918.
1,296,560. Patented Mar. 4, 1919.
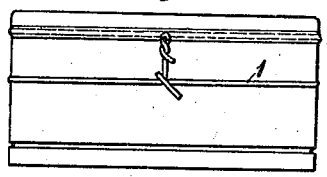
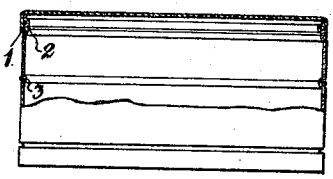
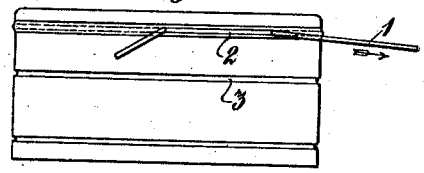
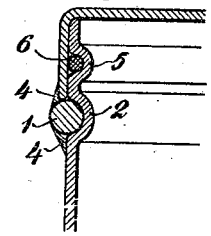
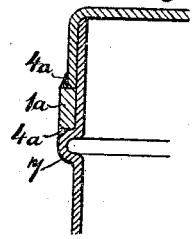
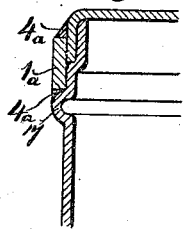
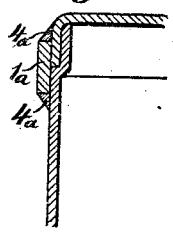
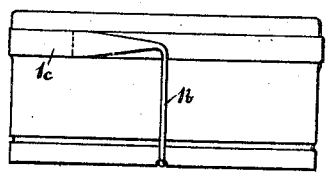
Inventor.
A. A. Rosengren
By H. R. Kerslake
Atty.

UNITED STATES PATENT OFFICE.

ANDERS ANDERSSON ROSENGREN, OF MALMÖ, SWEDEN.

HERMETICAL-SEALING DEVICE FOR BOXES, TINS, OR CANS FOR PRESERVES OR FOR OTHER VESSELS.

1,296,560.   Specification of Letters Patent.   Patented Mar. 4, 1919.

Application filed June 27, 1918. Serial No. 242,274.

*To all whom it may concern:*

Be it known that I, ANDERS ANDERSSON ROSENGREN, a subject of the King of Sweden, and resident of 70B Södra Förstadsgatan, Malmö, in the Kingdom of Sweden, mechanical engineer, have invented certain new and useful Improvements in Hermetical-Sealing Devices for Boxes, Tins, or Cans for Preserves or for other Vessels, of which the following is a specification, reference being made to the accompanying drawing.

The present invention relates to a device for the hermetical sealing of boxes, tins or cans for preserves or for other vessels. A sealing device carried out according to this invention is in the first place characterized by the fact that the means, by which the hermetical sealing is effected, is, together with the tightening means required, arranged on the vessel in such a manner that the means first mentioned, when removed from the vessel for the purpose of opening it, does not injure the wall or walls of the vessel nor the cover of the same, so that these parts remain in an uninjured condition after the opening operation. By this arrangement essential advantages are obtained, among which may be pointed out, that the vessel as well as its cover remains quite intact after the opening of the vessel, so that both may be once more used for storing a vessel content while completely excluding the atmosphere. A considerable inconvenience at the previous hermetical sealing devices is the one that the very vessel or cover or both are spoiled at the opening of the vessel, so that this cannot be used for a continued hermetical storing of the vessel content, which will, because of this, often grow inferior in quality or be spoiled, if it is not used immediately or within a short time after the opening operation. This inconvenience does not appear at vessels provided with a sealing device according to this invention. Moreover, the sealing means may be extended beyond the sealing joint to such an amount, that it forms a part or a means which is kept in the hand or acted upon by it for opening the vessel.

The annexed drawing shows by way of example different embodiments of this invention. Figure 1 shows, in front view, a can for preserves provided with a sealing device according to one of these embodiments. Fig. 2 shows a vertical section of this can, while Fig. 3 shows said can during the opening operation. Fig. 4 shows a vertical section of the top edge of the same can, while Figs. 5, 6 and 7 show vertical sections of modifications of the device shown in Figs. 1 to 4. Fig. 8 shows a front view of a can, provided with a further modification of the arrangement, shown in Figs. 1 to 4.

The essential means for the hermetical sealing of the vessel or the can consists in a comparatively easily flexible, but at the same time strong strip or wire 1 of metal (or other suitable material). That part of this wire which keeps the vessel sealed, is located in a groove 2, impressed in the can wall in the neighborhood of its top edge. One end of the wire 1 is twisted together with a middle portion of the wire so as to maintain the wire stretched in the groove 2. From this groove the wire runs down to a second groove 3 impressed into the can wall about between its top edge and its bottom edge, in which groove 3 the wire is maintained stretched thereby so that the other end of the same is pushed inside and bent down over the wire portion passing into the groove.

The top edge of the groove 2 is located in the same level as the lower edge of the cover border, and the wire 1 projects by about half its cross section beyond the exterior side of the can wall (see Fig. 4). In the corners, running around the can wall and located between the wire and the inferior edge of the cover border and between the wire and the can wall respectively, a metal (or a metal alloy) is placed by means of soldering, which metal effects, together with the wire, the hermetical sealing of the can.

This hermetical sealing device may be combined with a device for a secondary sealing of the can. For this purpose there may, above the groove 2 in the can wall, be impressed a groove 5 for a ring 6 of rubber or other elastic material. This ring extends, before putting the cover in place, somewhat outside the exterior side of the can wall, so that the ring after said operation will, in a compressed state, tighten against the inside of the cover border.

Sealing a can by means of the described device is carried out in the following manner. Firstly the ring 6 is placed in the groove 5, then the cover is put in place;

further the wire 1 is firstly placed in the groove 2 and then in the groove 3, and thereafter metal is soldered above and below the wire.

When opening the can (see Fig. 3) the wire portion located in the groove 3 is released, said portion being thereafter used as a handle and exposed to a pull, whereby the solderings 4 around the can are torn up, on account of which the cover may easily be removed. If thereafter the contents of the can or a portion of it is to be kept in the can, the ring 6, after positioning the cover, effects for some time an efficient hermetical sealing of the can.

As will be seen, neither the wall of the can nor its cover has been injured at the opening of the can, on account of which they are quite proper to be used once more in the same manner as before. This evidently means a very considerable advantage in an economical respect.

In the embodiment of this invention shown in Fig. 5 the can wall is provided with an exterior ridge 7, above which there is arranged the wire 1ª, which in this case, has a rectangular cross-section, so that it has the shape of a strip. The lower edge of the border of the cover, when applied, is situated near the wire or strip 1ª, and in the corners between the wire or strip 1ª and the ridge 7 and between the wire and the cover border respectively there is soldered a metal or metal alloy 4ª. Also in this case the wire extends beyond the solderings 4ª in order to form a handle at the tearing up of the solderings. Fig. 5 does, however, not show this continuation of the wire, nor the secondary sealing device.

The devices shown in Figs. 6 and 7 might be understood without further description with the aid of what has been set forth as to Fig. 5.

In the device shown in Fig. 8 that part 1ᵇ of the sealing and opening means, which at the opening of the vessel is kept in hand or acted upon by it, is formed by that part of a wire, the section of which is unaltered, while the other part 1ᶜ of said wire has been rolled out so as to form a strip, which as the strips 1ª in Figs. 6 and 7 runs around the joint between the wall of the vessel and its cover and which strip together with a tightening means (for instance tin or other metal or metal alloy) keeps the vessel hermetically sealed.

As will be seen from Fig. 8, the one part of the wire passes gradually into the other part, whereby a greater safety against tearing off of the wire between the two parts at the opening of the vessel is attained.

The wire part 1ᵇ, which in this case extends along the wall of the vessel in the height direction of the same and the free end of which enters below the bottom of the vessel, may also have another section.

The invention may, as is evident, be carried out in other manners than those, indicated by way of example. So, for instance, that portion of the metal wire which is held by the hand when opening the vessel, may be located in another way at the vessel or at the cover of the same. The metal wire may consist of two parts, connected with each other in any suitable manner, one of said parts being adapted for sealing the vessel and the other for opening the same. Instead of a metal or a metal alloy there may, at the wire, be applied any other suitable tightening means.

A considerable advantage of the present invention consists in the fact that the opening of a vessel may be effected without the aid of any special tool (which, when using other sealing devices, often is not at hand). Sealing devices, carried out according to this invention involve a very good and reliable sealing of vessels provided with them, and are, moreover, especially cheap, the costs of the material required and of the manufacture being very low.

Having now described my invention, what I claim as new and desire to secure by Letters Patent is:

1. In a can, the combination with a can body having an open top and upper and lower circumferential recesses arranged near the top of the body, an elastic packing located in the upper recess, of a cover for said open top having a depending flange embracing the upper portion of the can body and compressing said packing to seal the can, a metallic strip located at the lower recess, engaging the lower edge of the cover flange and extending around the can body, and fusible material sealing the joints between the strip, cover and body.

2. In a can, the combination with a body having an open top, of a cover for said body having a depending flange embracing the upper portion of the can body, a strip, rectangular in cross section, sealing the meeting lower edge of the top and body of the can, the ends of said strip overlapping one another and one of the ends being extended into a handle portion, which is circular in cross section and extends down the body of the can and is turned under the bottom of the can body to protect said end, and fusible sealing material placed along the edges of said strip.

3. In a can, the combination with a body having an open top and upper and lower exterior recesses, a resilient packing located in the upper recess, of a cover for said body having a depending flange embracing the upper portion of the body and compressing said packing, a strip, rectangular in cross section, arranged between the lower edge of the flange and said lower recess and extending entirely around the body, the ends of said strip overlapping one another and one end being extended down the body of the can and forming a handle portion of circular cross section, said handle portion being turned under the bottom of the body to protect the free end of the same, and fusible sealing placed between the edges of the strip and said can body.

In witness whereof I have hereunto set my hand in presence of two witnesses.

ANDERS ANDERSSON ROSENGREN.

Witnesses:
 WILH. ROSGVIST,
 KARL. HALLENGREN.

Copies of this patent may be obtained for five cents each, by addressing the "Commissioner of Patents, Washington, D. C."